United States Patent
Ikhlef et al.

(10) Patent No.: US 7,620,143 B2
(45) Date of Patent: Nov. 17, 2009

(54) DETECTOR ARRAY AND SYSTEM

(75) Inventors: Abdelaziz Ikhlef, Waukesha, WI (US);
Faisal Saeed, Waukesha, WI (US)

(73) Assignee: General Electric Company,
Schenectady, NY (US)

( * ) Notice: Subject to any disclaimer, the term of this patent is extended or adjusted under 35 U.S.C. 154(b) by 0 days.

(21) Appl. No.: 11/764,190

(22) Filed: Jun. 16, 2007

(65) Prior Publication Data

US 2008/0310585 A1   Dec. 18, 2008

(51) Int. Cl.
*A61B 6/00* (2006.01)

(52) U.S. Cl. .................. 378/19; 378/98.8; 250/368

(58) Field of Classification Search ............. 250/368; 378/19, 98.8
See application file for complete search history.

(56) References Cited

U.S. PATENT DOCUMENTS 5,625,662 A * 4/1997 Toth et al. .................. 378/16

2002/0038851 A1 * 4/2002 Kajiwara et al. ............ 250/368
2005/0111612 A1   5/2005 Ihklef et al.

* cited by examiner

*Primary Examiner*—Edward J Glick
*Assistant Examiner*—Mona M Sanei
(74) *Attorney, Agent, or Firm*—Peter Vogel, Esq.; Rick Wascher, Esq.; Michael G. Smith, Esq.

(57) ABSTRACT

In some embodiments, an optical mask for a CT detector is disclosed. In some embodiments, the mask is intercalated between a photodiode array and a scintillator array forming the CT detector. In some embodiments, the optical mask may extend along one or more axes and differentially absorbs and/or reflects light emitted from the scintillators at edges of photodiodes forming the diode array, with less absorption or reflection at edges of tiled die forming the diode array than in central portions of each of the die. Through selective absorption and/or reflection, transference of light photons from a scintillator to the photodiode corresponding to a neighboring scintillator is spatially modified, at least partially compensating for spatial differences in crosstalk signals between adjacent pairs of photodiode/scintillator cell elements. This reduction in differential crosstalk reduces artifacts in a reconstructing data descriptive of internal portions of a subject, which improves diagnostic value of the data.

23 Claims, 4 Drawing Sheets

Examiner's amendment to the drawings:

FIG. 9

DETECTOR ARRAY AND SYSTEM

FIELD OF THE DISCLOSURE

This disclosure relates generally to detector arrays for imaging technology, and in particular to a detector array providing improved signal detection capabilities and a computed tomography (CT) X-ray system incorporating the detector array.

BACKGROUND

Many medical diagnostic, surgical and interventional procedures rely on imaging tools to provide information descriptive of status of visually perceived representations of portions or organs of a patient. In part as a result of increasing sophistication of medical tools in general, and imaging apparatus in particular, more types of imaging devices are being adapted for application in the context of medical diagnostics and procedures.

In many instances, medical tools capable of rendering images of organs or tissues have found great utility and have been adapted to facilitate a broad variety of medical needs. These applications have resulted in development of a gamut of specialized imaging tools, including X-ray, CT and fluoroscopic visualizing aids, and many different types of optical imaging devices.

In many imaging applications, pixelated detectors are increasingly employed to realize electronic digital representations of image data. Some types of systems employ an array of scintillation cells and an associated array of photodiodes formed from a sheet of semiconductive material, where the scintillation material in each cell converts incident X-radiation to visible photons suitable for detection by the one diode in the array that is intended to be optically coupled to that cell. Mechanisms which degrade the signals from the diode array can cause machine-to-machine data instability, or reduce measurement or imaging repeatability, and may give rise to data distortion causing imaging defects such as ring artifacts, bands or smudges in the resultant data, when it is employed to form a visible image, or engender inaccuracy and/or reduced repeatability in the context of automated characterization of tissues.

In turn, digital techniques provide great imaging flexibility, such as, for example, overlay or direct comparison, on the fly, of various aspects and views from various times. For example, pre-surgery images can be available, in real time, in the operating room scenario, for comparison to images reflective of the present status of the same tissues. Many other types of special-purpose enhancements are now also possible. In some instances, imaging aids, such as contrast-enhancing agents, are introduced into the subject or patient to aid in increasing available data content from the imaging technique or techniques being employed.

However, regulatory changes, increasingly sophisticated measurement needs and other factors combine to place new demands on pixelated detectors for computed tomography applications, among others. Recent desire to even further reduce the total dose of X-radiation delivered to the subject, to reduce the energy of the X-rays on a per-photon basis and to achieve increased contrast parameters within the resulting images collectively demand greater linearity and sensitivity of the photodetector arrays used in such visualization tools, together with reduced image noise and artifacts of various sorts.

Signal artifacts resulting from the photodetector array itself also may pose some fundamental limits on overall system performance. Examples of mechanisms known to potentially give rise to crosstalk artifacts include: (i) charge carriers generated in one diode resulting in a signal in another diode, via carrier diffusion and/or inter-diode capacitance; (ii) scattering of X-rays from one scintillator cell to a neighboring scintillator cell, followed by conversion to a photon and detection of that photon by a diode coupled to the neighboring cell; (iii) leakage of light from a scintillator cell to a photodiode associated with another scintillator cell; and (iv) scattering of photons generated in the target scintillator cell into a neighboring scintillator cell through intercell septa, and thus to a photodiode associated with the neighboring cell. In many situations, where photodiodes are co-fabricated on a common substrate, diffusion of carriers from one photodiode to another contribute a dominant component to interdiode crosstalk.

In turn, these various artifacts present characteristics which vary linearly and nonlinearly with both X-ray fluence and operating parameters. Additionally, achieving alignment of the scintillator cell array with the photodiode array presents difficulty in manufacturing, with unwanted signal characteristics or artifacts being associated with residual imprecision in that process.

For the reasons stated above, and for other reasons discussed below, which will become apparent to those skilled in the art upon reading and understanding the present disclosure, there are needs in the art to provide improved photodiode/scintillator photodetectors in support of increasingly stringent and exacting performance and economic standards in settings such as medical imaging.

BRIEF DESCRIPTION

The above-mentioned shortcomings, disadvantages and problems are addressed herein, which will be understood by reading and studying the following disclosure.

In one aspect, a computed tomography detector system includes a photodiode array formed from multiple tessellated die each having a plurality of photodiodes formed thereon, and a scintillator array formed as a multiplicity of scintillation cells separated by septa. Each of the multiplicity of scintillation cells is associated with a respective one of the plurality of photodiodes to form a detector element. An optical mask that differentially spatially modifies transmission of light from each of the multiplicity of cells to a respective associated one of the plurality of photodiodes is intercalated between the photodiode array and the scintillator array. The optical mask provides different light transmission modification for detector elements at boundaries of each of the die than for detector elements in central portions of the die.

In another aspect, a computed tomography imaging system includes a patient table, an X-ray illumination source placed on one side of the patient table and a detector assembly comprising a plurality of detector elements placed on an opposed side of the patient table and oriented towards the X-ray illumination source. The imaging system also includes a computer control system controlling motion of the patient table and exposure of the plurality to X-rays which have passed through a patient, and forming spatial descriptions of internal aspects of the patient from data obtained from the detector assembly. The imaging system further includes an optical modulator formed in the detector assembly. The optical modulator differentially spatially modifies transmission of light from a scintillator cell associated with one detector element to a photodiode in a neighboring detector element.

In yet another aspect, a process for reducing differential crosstalk in a photodetector array includes optically masking first edges of first photodiodes to a first degree. The first edges form boundaries between adjacent photodiodes realized on a common die. The process also includes optically masking second edges of second photodiodes to a second degree that is less than the first degree. The second edges occur at die boundaries.

In a further aspect, a process for reducing differential crosstalk in an array of photodetector elements is described. The array is formed from a plurality of photodiodes, each associated with one of a multiplicity of scintillator cells. The process includes inhibiting lateral diffusion of photocarriers within a die across mutual photodiode edges. The process also includes optically coupling adjacent photodiodes formed on neighboring die to balance optically-induced crosstalk with photocarrier-induced crosstalk.

In a still further aspect, an array of photodetector elements includes multiple tiled die, each including a plurality of photodetectors, and a scintillator array including a multiplicity of scintillator cells separated by opaque septa. Each of the multiplicity is associated with a respective one of the plurality. The array also includes a crosstalk modification grid associated with the multiple tiled die, to differentially modulate crosstalk between photodetector elements formed in central portions of the multiple tiled die relative to crosstalk between adjacent photodetector elements formed on different ones of the multiple tiled die.

Systems and processes of varying scope are described herein. In addition to the features and benefits described in this summary, further aspects and advantages will become apparent by reference to the drawings and by reading the following detailed description.

DETAILED DESCRIPTION

In the following detailed description, reference is made to the accompanying drawings that form a part hereof, and in which are shown, by way of illustration, specific embodiments that may be practiced. These embodiments are described in sufficient detail to enable those skilled in the art to practice the embodiments, and it is to be understood that other embodiments may be utilized, and that logical, mechanical, electrical and other changes may be made, without departing from the scope of the embodiments.

Ranges of parameter values described herein are understood to include all subranges falling therewithin. The following detailed description is, therefore, not to be taken in a limiting sense.

The detailed description is divided into four sections. In the first section, a system level overview is provided. In the second section, an example of a pixelated photodiode array is described. In the third section, embodiments of improvements in tiled detector assemblies are described. The fourth section provides a conclusion which reviews aspects of the subject matter encompassed in the preceding segments of the detailed description. A technical effect of the systems and processes described herein includes reduction of crosstalk-induced artifacts in images formed using tesselated arrays of photodiode/scintillator assemblies.

I. System Overview

Figure 1:
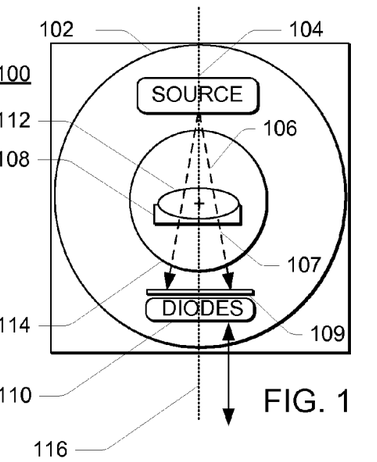
FIG. 1 is a block diagram of an overview of a system configured to improve the display of images from an imaging apparatus.

FIG. 1 is a simplified diagram of an overview of a modified system 100 configured to improve X-ray imaging operations. The system 100 optionally includes a gantry 102 or other support for an illumination source 104, such as an X-ray illumination source, capable of providing illumination 106, such as X-rays or other non-destructive internal imaging illumination, and may optionally include a test subject support 108 that is transmissive with respect to the illumination 106 and that is positioned above a scintillator 109 and diode array 110 that is also opposed to the illumination source 104. The scintillator 109 and diode array 110 collectively form a CT detector system.

In one embodiment, components of the system 100 and a test subject 112 are maintained in a defined geometric relationship to one another by the gantry 102. A distance between the illumination source 104 and the diode array 110 may be varied, depending on the type of examination sought, and the angle of the illumination 106 respective to the test subject 112 can be adjusted with respect to the body to be imaged responsive to the nature of imaging desired.

In one embodiment, the test subject support 108 is configured to support and/or cause controlled motion of the test subject 112, such as a living human or animal patient, or other test subject 112 suitable for non-destructive imaging, above the scintillator 109/diode array 110 so that illumination 107 is incident thereon after passing through the test subject 112. In turn, information from the detector array 110 describes internal aspects of the test subject 112.

The scintillator 109 may be a conventional scintillator 109, optically coupled to a two-dimensional array of photodiodes or any other form of diode array 110 suitable for use with the type or types of illumination 106 being employed, such as X-rays. The detector elements are typically tessellated in a mosaic. The scintillator 109 converts incident photons comprising electromagnetic radiation, such as X-rays, from high-energy, high-frequency photons 107, into lower-energy, lower-frequency photons corresponding to spectral sensitivity of the detector elements, in a fashion somewhat analogous to fluorescence, as is commonly known in the context of many visible-light sources in use today. Materials useful in scintillator layers 109 include ceramics formed from materials such as gadolinium oxysulfide activated with rare earths, such as terbium (GOS:Tb), cadmium tungstate, yttrium gadolinium oxide with suitable activation components, cesium iodide, etc.

In some modes of operation, such as CT, the gantry 102 and test subject support or table 108 cooperatively engage to move the test subject 112 longitudinally, that is, along an axis extending into and out of the plane of FIG. 1 and within an opening 114. In some modes of operation, the gantry 102 rotates the X-ray source 104 and diode array 110 about the axis 116, while the support 108 moves longitudinally, to provide a helical series of scans of the test subject 112.

There are many different possible ways for achieving reduced signal artifacts from detectors 110, providing improved robustness and repeatability of measurements and characterizations possible via the system 100, and of achieving other benefits of the subject matter disclosed herein. The apparatus of FIGS. 2 and those following FIG.2 described below in more detail with reference to Section II, provide but a few examples for addressing these various needs.

II. Exemplary Pixelated Detectors

Figure 2:
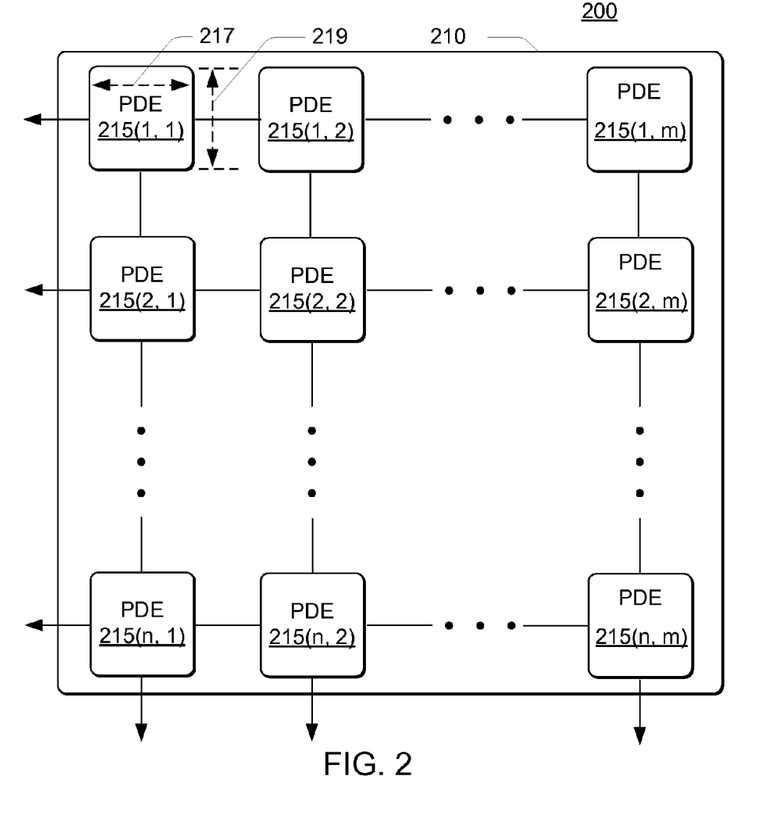
FIG. 2 is a simplified block diagram illustrating a pixelated detector system that is useful in the context of the system of FIG. 1.
Figure 3:
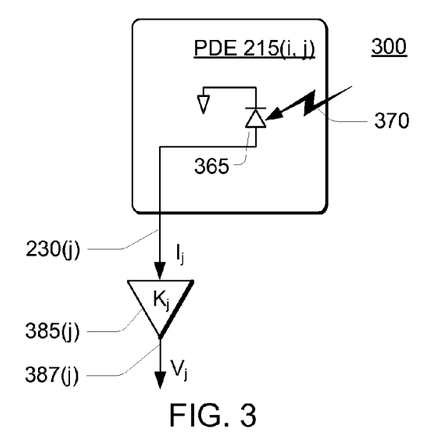
FIG. 3 is a simplified block diagram illustrating a detector element that is useful in the context of the pixelated detector system of FIG. 2.

FIG. 2 is a simplified block diagram illustrating a pixelated detector system 200 that is useful in the context of the system 100 of FIG. 1. The pixelated detector system 200 includes a photodetector array 210 (e.g., part of the diode array 110 of FIG. 1), which in this example is assumed to be an N×M array, where N and M represent integers describing a number of rows and columns in the photodetector array 210. For example, a die might include an array of 16×64 photodiodes, although other sizes of die may be employed. FIGS. 2 and 3 also employ "i", "j", "n" and "m" to represent integers, where i varies over a range $\{1, N\}$, and j varies over a range $\{1, M\}$.

The detector array 210 comprises a matrix or mosaic of detector elements 215 or pixel elements 215, i.e., detector element PDE 215(1, 1) through detector element PDE 215(n, m), each having a first dimension 217 and a second dimension 219. In the example of FIG. 1, the detector elements PDE 215(i, j) thus each have an area that is equal to a product a×b, where the first dimension 217 is represented as "a" and the second dimension 219 is represented as "b". The first 217 and second 219 dimensions typically range between 800 micrometers and one millimeter, and the first dimension 217 need not be chosen to be equal to the second dimension 219. In other words, the detector elements PDE 215(i, j) need not be square, and may be rectangular or may have shapes which are neither square nor rectangular. The detector elements PDE 215 are typically arranged along respective rows and columns as illustrated.

FIG. 3 is a simplified block diagram 300 illustrating a detector element PDE 215(i, j) that is useful in the context of the pixelated detector system 200 of FIG. 2. The diodes 365 are fabricated to each include a relatively large photosensitive surface area (a×b, FIG. 2), ensuring that the diodes 365 are capable of intercepting a representative portion of optical excitation 370, responsive to illumination 107 that has passed through the test subject 112.

In order to acquire an X ray image using the detector array 210, the system 100 may perform a variety of sequences. One exemplary sequence is as follows. Exposure of the scintillator elements to X-rays 106' selectively attenuated by passage through particular portions of the test subject 112 results in an amount of light 370 proportional to the intensity of the X-rays 106' incident on that photodetector element PDE 215(i, j). In turn, that photodetector element PDE 215(i, j) passes a current $I_j$ that then is directed through the column signal lines 230(j), and thus to a respective transimpedance amplifier 385(j) having a current-to-voltage transfer ratio of $K_j$, and thereby converting the current $I_j$ into a voltage $V_j$ manifested on output line 387(j).

Channel-to-channel variations in linearity of response of the photodetectors degrade accuracy of data acquired by tomographic scanners. Crosstalk between adjacent channels may also compromise dynamic range and other properties of the signals. Differential crosstalk, that is, a difference in crosstalk from a $j-1^{TH}$ channel to a $j^{TH}$ channel with crosstalk from the $j+1^{TH}$ channel to the $j^{TH}$ channel, also may be a significant source of error in measured data.

Further, variations in differential crosstalk also impact the achievable precision and accuracy of data collection. Generally, reducing both crosstalk and differential crosstalk results in improved spatial resolution and in increased dynamic range, fewer anomalies or artifacts in the tomographically-obtained data and/or in automated assessments of lesions or in reconstructed CT images.

Figure 4:
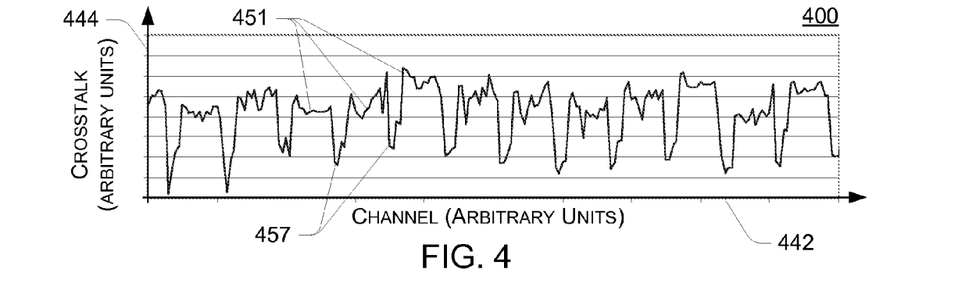
FIG. 4 is a graph showing how crosstalk may vary across boundaries between tiled die that each include an array of photodiodes.

FIG. 4 is a graph 400 showing how crosstalk may vary across multiple tiled die, where each die includes a plurality of photodiodes. The graph 400 has an abscissa 442, labeled "Channel" and an ordinate 444, labeled "Crosstalk", both expressed in arbitrary units. For example, the abscissa 442 might correspond to a range of 200 channels, while the ordinate 444 might correspond to values ranging from five percent at the low end shown in the illustration, to a value of nine percent at the upper end shown in FIG. 4.

CT detectors, such as the detector system 200 of FIG. 2, meet tight performance requirements in order to enable the generation of high quality and artifact-free CT images and to be able to provide robust quantitative data for other purposes, such as automated computation of tumor size. The detector system 200 provides a response that is linearly related to incident X-ray intensity. Some other requirements are stability of the detector system 200 over time and temperature, sensitivity to focal spot motion, light output variation (sensitivity changes) over a useful life of the detector system 200, etc. In CT scanners 100 of the types being currently developed and deployed, response behavior of adjacent channels or detector elements are intended to be nearly identical in order to reduce serious ring artifacts (usually defined as channel to channel non-linearity variation). This variation might be affected by the scintillator behavior from one pixel to its neighbor, by the collimator and by the diode pixel response. Generally, if these requirements are not met, ring artifacts, bands or smudges might appear in images.

In FIG. 4, plateaus 451 each correspond to a linear group of photodiodes (each corresponding to a respective one of adjacent channels), for example, eight photodiodes, all formed on one die, while dips 457 correspond to lateral separations or gaps between individual die boundaries. The dips 457 arise because photo-induced charge carriers cannot diffuse across lateral gaps between die boundaries, and, as a result, a component of crosstalk which is associated with adjacent photodiodes in an array of photodiodes formed on the same die is absent from diodes at die boundaries. As a result, there is non-uniformity in crosstalk response, which, in turn, detracts from robustness of data from the detector array and may give rise to undesirable distortion or artifacts in images formed from data from the detector array.

Diode-to-diode electrical crosstalk between the detector pixels is mainly driven by the lateral diffusion of photon-induced charge carriers in the semiconductor material forming the die. The amount of electrical crosstalk presented is dependent on, among other things, the thickness of the diode layer and the properties of the semiconductor material. Lateral diffusion of photocarriers generally leads to an effective photoactive area that is larger than the geometric area of the photodiode collection junction. Diffusion of photocarriers to adjacent photodiodes leads to crosstalk because some photocarriers diffuse out of the target diode in the pixel collection site in which they are generated and are collected by the diode in the neighboring pixel collection site, giving rise to a current in the adjacent photodiode. This effect is more pronounced in back-illuminated diodes, because the thickness of the diodes increases the diffusion length before collection.

However, in the example of FIG. 4, the fact that the crosstalk between adjacent diodes which are on different die is not zero allows differences in crosstalk between adjacent diodes on one die and adjacent diodes on separate die to be compensated, to some extent, by modification of optical masking or shielding for diode edges at die edges in comparison to masking or shielding between adjacent diodes on the same die.

The subject matter to follow describes apparatus and processes for reducing unwanted signal artifacts due to crosstalk between adjacent photodiodes formed on the same die. In turn, spatially modulating that reduction in crosstalk magnitude may also reduce differential crosstalk, that is, a difference between crosstalk originating on one side of a photodiode and crosstalk originating on an opposed side of that photodiode. This is discussed below in more detail in Section III below, with reference to FIGS. 5 through 9.

III. Embodiments

Figure 5:
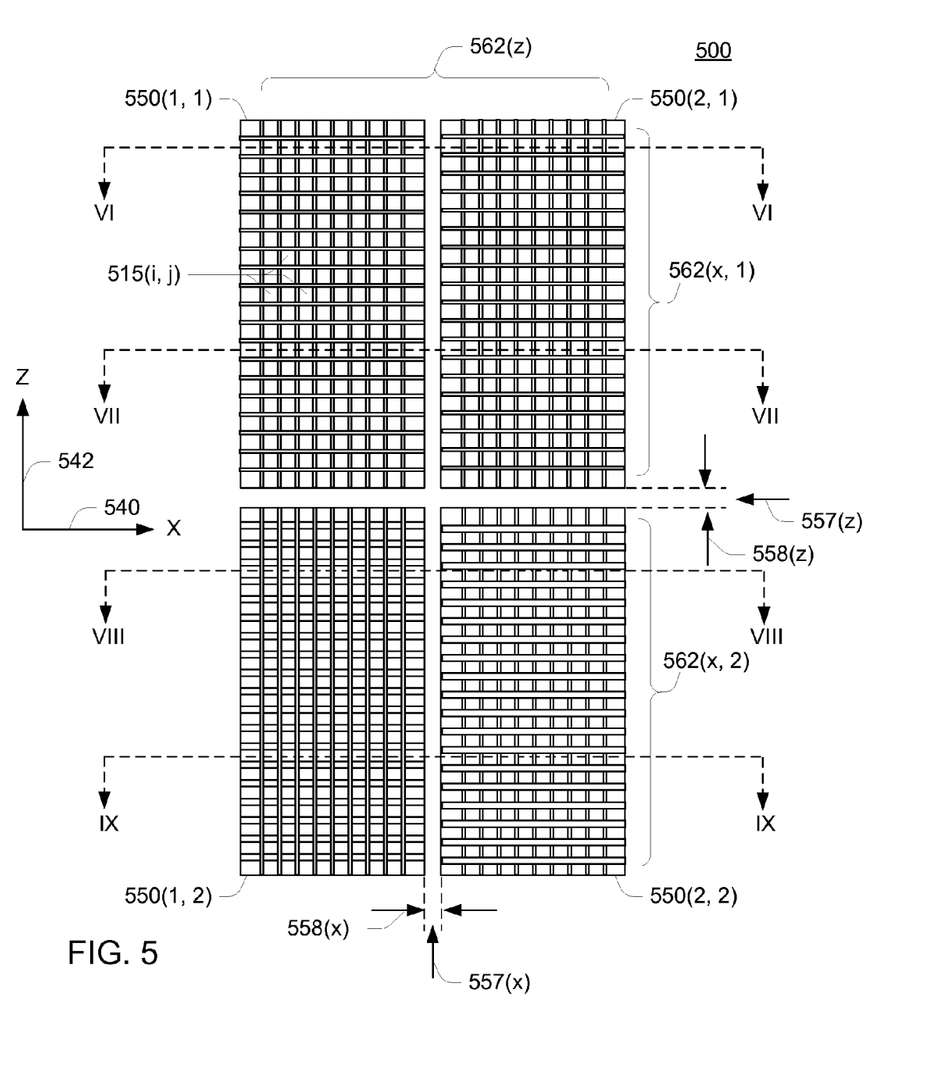
FIG. 5 is a simplified block diagram illustrating an array of four tiled photodiode die and optical masking associated with the tiled photodiode die, in accordance with the teachings of the presently-disclosed subject matter.

FIG. 5 is a simplified block diagram 500 showing pixelated detector elements 515(i, j) arrayed in a planar fashion, for example in a plane defined by X 540 and Z 542 axes, illustrating a tesselation of four photodetector diode die 550(1, 1) through 550(2, 2). Optical masking 562(x) and 562(z) elements are shown in FIG. 5 as forming a rectilinear grid structure and are collectively associated with the tiled photodiode die 550(1, 1), 550(1, 2), 550(2, 1) and 550(2, 2), in accordance with the teachings of the presently-disclosed subject matter. In one embodiment, the optical mask elements 562 reduce transmissivity of light therethrough. In one embodiment, the optical mask elements 562 comprise opaque masking materials. As seen in FIG. 5, the diodes 515 (pixels) located at boundaries do not have mask 562 along the die edges in order to balance the crosstalk and compensate for the boundary effect.

The optical mask elements 562 form a grid to selectively reduce the active area of the photodiodes in the photodetector elements 515(i, j) by inhibiting photons 370 (FIG. 3) from incidence at outer edges of the photodiodes in the photodetector elements 515(i, j). The diffusion length for free carriers in semiconductors is finite. As a result, limiting the active area of the photodiodes in the photodetector elements 515(i, j) to the more central portions of the photodiodes reduces carrier diffusion to photodiodes in adjacent photodetector elements 515(i, j).

The illustration shown in FIG. 5 also depicts lateral gaps 557(x) at boundaries of the die 550 having width 558(x). FIG. 5 also depicts gaps 557(z) at boundaries of the die 550 having width 558(z). The lateral gaps 557 correspond to the dips 457 representing reduced crosstalk, as shown in FIG. 4. Optical masking elements 562 are arranged along coordinates which may be orthogonal (as illustrated) or which may conform to other coordinate systems. In the example of FIG. 5, the optical mask elements 562 are not placed on boundaries of the die 550. As a result, crosstalk is increased between adjacent first photodiodes formed on neighboring die 550 relative to second photodiodes formed in central regions of the die, and the increased crosstalk due to optical effects for the first photodiodes offsets the diffusion-related component of crosstalk in the second photodiodes.

In other words, the optical mask elements 562 selectively spatially modulate crosstalk between adjacent photodetector elements 515(i, j), depending on the position of the photodetector elements 515(i, j) on the die 550 to provide different degrees of transmission modification between elements distributed along a common axis. Put another way, photodetector elements 515(i, j) within an interior portion of the die (i.e., having neighboring photodetector elements 515(i, j) on all sides) are surrounded on all sides by optical masking elements 562 and thus experience one degree of optical masking, while photodetector elements 515(i, j) along boundaries of the die 550 have at least one edge which experiences a different (reduced) degree of optical masking by the optical masking elements 562.

The masking elements 562(z) are illustrated as having uniform widths, while the masking elements 562(x, 1) (upper portion of FIG. 5) are shown as having a first width, comparable to the width of the vertical masking elements 562(z), and the masking elements 562(x, 2) (lower portion of FIG. 5) are shown as having a second width that is greater than that of the other masking elements 562(z) and 562(x, 1). The upper and lower portions of FIG. 5 thus represent two different embodiments of the presently-disclosed subject matter.

Typically, individual photodetector elements 515(i, j) might have dimensions ranging from circa eight hundred micrometers on a side, to one millimeter by one millimeter, however, other sizes and other arrangements, such as rectangular photodetector elements 515(i, j), are possible. The lateral gaps 557(x) and 557(z) may have respective widths 558(x) and 558(z) on the order of fifty to about one hundred micrometers, although narrower or broader lateral gaps 557 may be employed.

In the upper portion of FIG. 5, widths of the vertically-oriented masking stripes 562(z) are represented as being comparable to widths of the horizontally-oriented masking stripes 562(1, x). When the extent of an individual photodetector element 515 in one dimension, such as parallel to the X axis 540, differs from the extent of the same element 515 in another dimension, such as along the Z axis 542, it may be appropriate to employ different widths of masking stripes 562 along different axes, for example, as shown by the wider horizontal stripes 562(x, 2) depicted in the lower portion of FIG. 5. The larger dimension (the long side of the rectangle, for example) would tend to give rise to higher crosstalk due to diffusion of photo-generated mobile charge carriers and thus a greater width for the optical mask elements 562 running along those longer edges may be appropriate.

Other configurations of optical modulation elements 562 are possible and useful. For example, in one embodiment, masking elements 562(z) might not be present, with masking elements 562 such as either masking elements 562(1, x) or 562(2, x) being employed, and with edges or perimeters of die 550 being masked to a different extent than interior portions, or not being masked at all. Such an arrangement provides different optical masking 562 at the edges or perimeters of the die 550 than in central regions (photodetector elements 515 having neighbors on all sides, for example), and also differentially modulates crosstalk effects along the X 540 and Z 542 axes.

In an analogous manner, in one embodiment, masking elements 562(x) might not be present, with masking elements such as masking elements 562(z) being employed, resulting in differential modulation of crosstalk along the X 540 and Z 542 axes, together with edges or perimeters of die 550 being masked to a different extent than interior portions, or not being masked at all.

Also, any of a variety of methods for creation of suitable masks 562 may be employed. In one embodiment, a mechanical grid may be separately formed and emplaced atop the die 550 to realize a suitable optical mask 562. In one embodiment, screen printing may be employed to apply an optical mask 562 to the tesselated die 550, or to the scintillator array, or both. In one embodiment, photolithographic techniques may be used to pattern a layer of applied material formed on the tesselated die, the scintillator array, or both, to realize a suitable optical mask 562.

The optical mask 562 reduces the effective gain of the photodiodes because the light collecting area (a×b, described above with reference to FIG. 2) is reduced. Additionally, because the area reductions are not equal for photodiodes at boundaries of the die 550 and photodiodes in central portions of the die 550, gain equalization may be desired.

In one embodiment, the masking elements 562 or optical crosstalk inhibitors 562 comprise light absorbing materials having a thickness consistent with providing low transmissivity for incident visible light, or photons having energies near the visible range. Light absorbing materials may include light absorbent silicon, black polyimide, or other low-albedo materials.

In one embodiment, the masking elements 562 may comprise light reflective materials, such as metallic layers. For example, a layer of aluminum of suitable thickness may form a high-albedo layer having very low transmissivity for visible light, for photons having energies near the visible range. Reflective mask elements 562 may act to reduce effective gain loss by reflecting photons back to the target photodiode.

FIGS. 6 through 9 are side views, in section, taken along section lines shown in FIG. 5, depicting simplified block diagrams of photodetector assemblies 600, 700 or subassemblies 800, 900 capable of utility in the system 100 of FIG. 1, in accordance with the teachings of the presently-disclosed subject matter. The examples of FIGS. 6 through 9 are not necessarily mutually exclusive and are not drawn to scale.

The embodiments 600 through 900 are depicted in configurations involving or compatible with "back-illuminated" photodiode array arrangements. The term "back-illuminated" refers to photodiodes structured to respond to illumination (such as photon 370 of FIG. 3) incident on a semiconductor surface which is opposed to a surface adjacent a p-n or other diode junction.

For simplicity of illustration and ease of understanding, some conventional components used in forming CT photodetector arrays have not been depicted in these FIGS. By way of example, conductors associated with photodiodes are not depicted in FIGS. 6 through 9, and not all layers forming portions of scintillators are necessarily illustrated.

Figure 6:
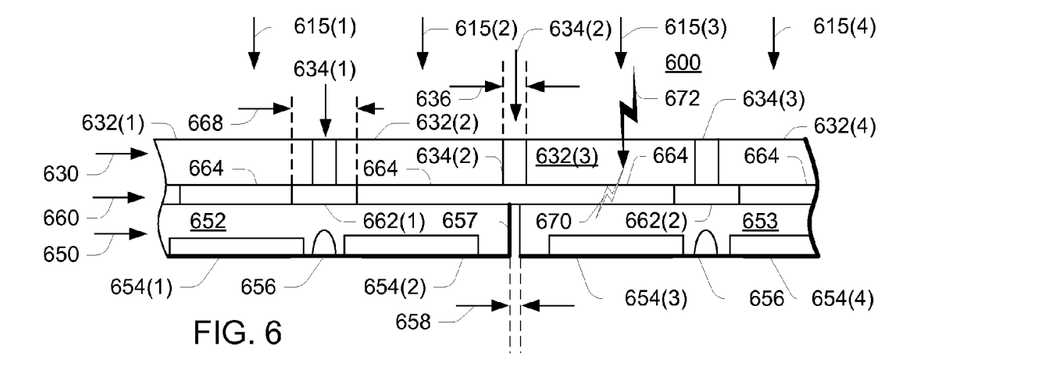
FIGS. 6 through 9 are simplified side views, in section, taken along section lines shown in FIG. 5, depicting simplified block diagrams of photodetector assemblies or subassemblies capable of utility in the system of FIG. 1, in accordance with the teachings of the presently-disclosed subject matter.

FIG. 6 is a side view, in section, showing the photodetector assembly 600 in cross-section, taken along section lines VI-VI of FIG. 5, and illustrating a group of four photodetector elements 615(N). The photodetector elements 615(N) are formed via a scintillator array 630 comprising scintillator cells 632 separated by conventional septa 634 each having a width 636, such as one hundred micrometers, although larger or smaller septa 634 may be employed. A photodiode array 650 is represented by two semiconductor die 652 and 653 which include a plurality of photodiodes 654(N).

More specifically, the die 652 includes adjacent or neighboring doped regions or photodiodes 654(1) and 654(2). The die 653, neighboring the die 652, includes doped region or photodiode 654(3) adjacent the photodiode 654(2) and also includes adjacent doped region or photodiode 654(4). Channel stops 656 formed from dopants introduced into the die of semiconductive material 652, 653 to at least partially electrically separate doped regions or photodiodes 654(N) that are adjacent one another on a single die 652 or 653, while a physical lateral gap 657 having a width 658 separates adjacent or neighboring doped regions or photodiodes 654(N) formed on different adjacent die 652 and 653.

In one embodiment, the die 652 and 653 are formed from single-crystal silicon which is doped to be n-type (i.e., forms a cathode), while doped regions 654(N) are counterdoped to be p-plus-type (heavily doped) regions (i.e., to form an anode). In one embodiment, the channel stops 656 may also be counterdoped to be p-type or p-plus-type regions.

An optical modulation region 660 including an optical mask 662 and optically transmissive or optical coupler portions 664 is intercalated, inserted, formed or sandwiched between the scintillator array 630 and the photodiode array 650. In other words, optical crosstalk inhibitors 662 (i.e., analogous to optical mask elements 562 of FIG. 5) are interstitially layered between the photodiode array 650 and the scintillator array 630, with light (i.e., optically) transmissive regions 664 formed between the optical mask elements or stripes 662. The light transmissive regions 664 act as optical couplers for guiding photons from the scintillator cells 632 to the associated photodiodes 654. In one embodiment, the light transmissive regions 664 comprise vertical air gaps, however, it will be appreciated that other materials (such as epoxy) having suitable contrast capabilities relative to the mask elements 662 may be employed. Although the regions 664 are intended to be transmissive, the regions 664 contribute a degree of optical masking. For example, a small degree of reduction of transmissivity might be due to reflections etc.

The optical mask elements 662 shown in FIG. 6 have a uniform width dimension 668. In one embodiment, the width 668 of the reflective or absorbing mask elements 662 is larger than a width 636 of the septa 634 or lateral gap 634 between active scintillator elements 632.

The optical mask elements 662 thus extend laterally outward of the septa 632 and consequently reduce or inhibit photons 670 from impinging on or immediately adjacent to edge portions of the photodiodes 654 which comprise boundaries shared by neighboring photodiodes 654. As a result, the active area of the photodiodes 654 associated with such optical masking elements 662 is reduced, which reduces the gain or sensitivity of the photodiodes 654 by inhibiting photon-induced generation of mobile carriers (aka "photocarriers") immediately adjacent the shared boundary. Introducing a controlled, additional degree of separation between active portions of adjacent photodiodes 654 also reduces diffusion of photocarriers between adjacent photodiodes 654 and thus reduces crosstalk between neighboring pixel in the photodetector.

The optical mask elements 662 are shown beneath the septa 634(1) and 634(3), but no optical mask element 662 is shown in FIG. 6 atop the lateral gap 657 between the die 652 and 653. As a result, the reduction in crosstalk between adjacent diodes 654(1), 654(2) on die 652, and between neighboring diodes 654(3), 654(4) on die 653 is offset by the crosstalk from mechanisms other than free carrier diffusion.

In operation, an optical photon 670 results when a high energy photon 672, such as an X-ray, is incident on one of the scintillator cells 632. Many of the optical photons 670 then travel to the associated target photodiode 654(3). However, as noted earlier, some of the incident high energy photons (such as X-rays) 672 are scattered into adjacent scintillator cells 632; some of the optical photons 670 are scattered into adjacent photodiodes 654; and some of the charge carriers produced in the intended or target photodiode 654 by incident optical photons 670 diffuse into neighboring photodiodes 654 formed on the same die 652 or 653. These diverse mechanisms combine in formation of electrical signals representing crosstalk between adjacent or neighboring photodetector elements 615.

Figure 7:
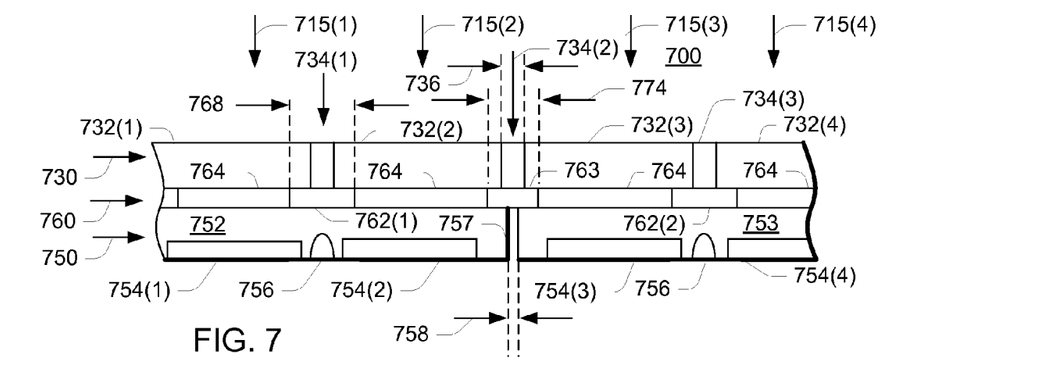

FIG. 7 is a side view, showing the photodetector assembly 700 in cross-section, taken along section lines VII-VII of FIG. 5, illustrating a group of four photodetector elements 715(N) formed from a scintillator array 730 comprising scintillator cells 732 separated by conventional septa 734 each having a width 736, as described above.

A photodiode array 750 is represented by two semiconductor die 752 and 753, having photodiodes 754(N) formed thereon and separated within each die by channel stops 756. A physical lateral gap 757 having a width 758 separates adjacent or neighboring doped regions or photodiodes 754(N) formed on different adjacent die 752 and 753.

An optical modulation region 760 includes optical mask elements 762 and 763, and optically transmissive or optical coupler portions 764, which are collectively interposed between the scintillator array 730 and the photodiode array 750. The optical mask elements 762 shown in FIG. 7 have a first width dimension 768. The optical mask element 763 has a second width dimension 774 which is less than the first width dimension 768. The second width dimension 774 is larger than the width 736 of the septa 734 or lateral gaps 734 between scintillator elements 732.

The optical mask elements 762 having the first width 768 are shown beneath respective septa 734(1) and 734(3). An optical mask element 763 is depicted in FIG. 7 atop the lateral gap 757 between the die 752 and 753. As a result, the reduction in crosstalk between adjacent diodes 754(1), 754(2) on die 752, and between neighboring diodes 754(3), 754(4) on die 753 due to the respective optical mask elements 762(N) is partially offset by the crosstalk from mechanisms other than free carrier diffusion.

Figure 8:
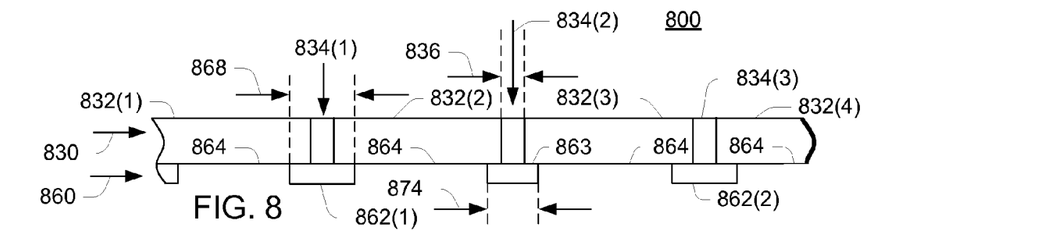

FIG. 8 is a side view, showing the photodetector subassembly 800 in cross-section, taken along section lines VIII-VIII of FIG. 5, illustrating a scintillator array 830 comprising scintillator cells 832 separated by conventional septa 834 each having a width 836, as described above.

An optical modulation region 860 including optical mask elements 862 and 863 and optically transmissive or optical coupler portions 864 is shown on a bottom or lower surface of the scintillator array 830. The optical mask elements 862 shown in FIG. 8 have a first width dimension 868, while the optical mask element 863 has a second width dimension 874 which is less than the first width dimension 868. The second width dimension 874 is larger than the width 836 of the septa 834 or the septa or lateral gaps 834 between and separating active scintillator elements 832.

The optical mask elements 862 having the first width 868 are shown beneath respective septa 834(1) and 834(3). An optical mask element 863 is depicted in FIG. 8 at a location which later will be atop a lateral gap between adjacent die, as shown and described above with reference to FIGS. 6 and 7 and associated text.

Figure 9:
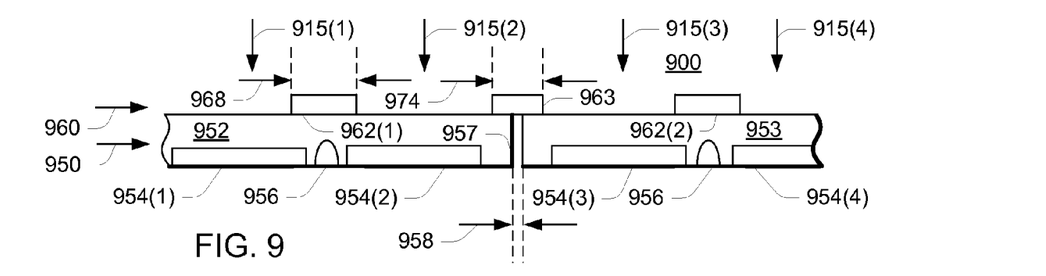

FIG. 9 is a side view, showing the photodetector subassembly 900 in cross-section, taken along section lines IX-IX of FIG. 5, illustrating a group of four photodetector elements 915(N) formed from a photodiode array 950. The photodiode array 950 is represented by two semiconductor die 952 and 953, having photodiodes 954(N) formed thereon and separated within each die by channel stops 956. A physical lateral gap 957 having a width 958 separates adjacent or neighboring doped regions or photodiodes 954(N) formed on different adjacent die 952 and 953.

An optical modulation region 960 including optical mask elements 962 and 963 and optically transmissive portions or optical couplers 964 is formed atop the photodiode array 950. The optical mask elements 962 shown in FIG. 9 have a first width dimension 968. The optical mask element 963 has a second width dimension 974 which is less than the first width dimension 968. The second width dimension 974 is larger than widths of septa between scintillator elements, such as widths 636, 736, 836 of respective septa 634, 734 or 834 between active scintillator elements 632, 732 or 832, of FIGS. 6, 7 and 8, respectively.

The optical mask elements 962 having the first width 968 are positioned between adjacent photodiodes 954(1), 954(2) and 954(3), 954(4), respectively. The optical mask element 963 having the second width 974 is depicted in FIG. 9 atop the lateral gap 957 between the die 952 and 953.

In the embodiments 700, 800 and 900 of FIGS. 7, 8 and 9, respectively, the respective gaps 757, 857 and/or 957 may be optically transmissive, or may be optically transparent. The gaps 757, 857 and/or 957 may be air gaps. Alternatively, the gaps 757, 857 and/or 957 may be filled with material (such as a suitable epoxy) forming an optical coupler between respective neighboring diode pairs 754, 854 and/or 954 formed on respective adjacent die 752, 753; 852, 853 and/or 952, 953. In these embodiments, the optical mask elements 662, 762, 763, 862, 863, 962, 963 may have respective widths 668, 768, 774, 868, 874, 968, 974 in a range of from about one hundred to about three hundred micrometers. In other words, the optical mask elements 662, 762, 763, 862, 863, 962, 963 may have respective widths 668, 768, 774, 868, 874, 968, 974 in a range of from about fifty to about two hundred micrometers greater than widths 636, 736, 836 of the respective septa 632, 732, 832.

In one embodiment, deep diffusion of traps, or carrier killing dopants, for example in regions 656 (FIG. 6), 756 (FIG. 7) or 956 (FIG. 9), in semiconductive materials, can also be employed to selectively inhibit diffusion of light-induced free charge carriers from one photodiode to a neighboring photodiode.

Differential crosstalk includes at least two components. One component arises from misalignment of scintillator cells vis-a-vis the associated photodetectors. Another component is due to differences in the physical environments, and thus the physical phenomena giving rise to crosstalk, for photodiodes lacking a neighbor on at least one side, relative to photodiodes that are surrounded by nearest neighbors.

As a result, an optical mask having opaque or relatively non-transmissive optical properties that is wider than septa between scintillator cells may reduce the performance impact of misalignment with respect to those photodiodes which are surrounded by nearest neighbor photodiodes. As a further result, spatially modulating the degree of masking to provide less masking along diode edges not abutted by nearest neighbor photodiodes permits crosstalk from one set of physical phenomena to be balanced against crosstalk derived from another set of physical phenomena to realize reduced differential crosstalk.

IV. Conclusion

The disclosed examples of the preceding sections combine a number of useful features and present advantages in contemporary CT scanner applications. These examples reduce variations in crosstalk between adjacent or neighboring imaging elements, and thus provide more robust data for image formation or for quantitative estimate (e.g., tumor size) purposes. Additionally, these examples relax need for precision control of scintillator mechanical dimensions as well as tolerance requirements of diode-scintillator alignment in assembly.

The disclosed subject matter reduces crosstalk between adjacent photodiodes formed on the same die and also employs spatially modulated reduction in crosstalk magnitude to reduce differential crosstalk, that is, a difference between crosstalk originating on one side of a photodiode and crosstalk originating on an opposed side of that photodiode. The present disclosure describes a variety of approaches to reducing signal artifacts arising from both crosstalk and differential crosstalk, resulting in improved spatial resolution and in increased dynamic range An optical modulator formed from elements having opaque or relatively non-transmissive optical properties that are aligned with and wider than septa between scintillator cells may reduce the performance impact of misalignment with respect to those photodiodes which are surrounded by nearest neighbor photodiodes. Also, spatially modulating the degree of masking permits crosstalk derived from different physical phenomena to offset one another and thus to reduce differential crosstalk.

Although specific embodiments have been illustrated and described herein, it will be appreciated by those of ordinary skill in the art that any arrangement which is calculated to achieve the same purpose may be substituted for the specific embodiments shown. This disclosure is intended to cover any adaptations or variations. For example, although described in procedural terms, one of ordinary skill in the art will appreciate that implementations can be made in a procedural design environment or any other design environment that provides the required relationships.

In particular, one of skill in the art will readily appreciate that the names or labels of the processes and apparatus are not intended to limit embodiments. Furthermore, additional processes and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types. The terminology used in this disclosure is meant to include all object-oriented, database and communication environments and alternate technologies which provide the same functionality as described herein.

What is claimed is:

1. A computed tomography detector system comprising:
a photodiode array formed from multiple tessellated die each having a plurality of photodiodes formed thereon;
a scintillator array comprising a multiplicity of scintillation cells separated by septa, each of the multiplicity of scintillation cells being associated with a respective one of the plurality of photodiodes and thus forming a detector element; and
an optical mask interstitially layered between the plurality of photodiodes and the multiplicity of scintillation cells that spatially differentially modifies transmissivity of light transmitted from each of the multiplicity of scintillation cells to the respective associated one of the plurality of photodiodes, wherein the optical mask provides different transmissivity of light modification for detector elements at boundaries of each of the die than for detector elements in central portions of the die.

2. The computed tomography detector system of claim 1, wherein the optical mask selectively spatially modulates crosstalk between adjacent detector elements in the center region of the die and between die to die.

3. The computed tomography detector system of claim 1, wherein the optical mask provides reduced light transmission modification for detector elements at boundaries of each of the die than for detector elements in central portions of the die.

4. The computed tomography detector system of claim 1, wherein the optical mask is applied to the tessellated die.

5. The computed tomography detector system of claim 1, wherein the optical mask is applied to the scintillator array.

6. The computed tomography detector system of claim 1, wherein the optical mask comprises:
a first optical mask applied to the tessellated die; and
a second optical mask applied to the scintillator array.

7. The computed tomography detector system of claim 1, wherein the optical mask comprises a light absorptive material or a light reflective material.

8. The computed tomography detector system of claim 1, wherein the optical mask provides a different degree of spatial light modification along one axis than along another axis.

9. A computed tomography imaging system comprising:
a patient table;
an X-ray illumination source placed on one side of the patient table;
a detector assembly comprising a plurality of detector elements placed on a side of the patient table opposed to, and oriented towards, the X-ray illumination source;
a computerized control system controlling motion of the patient table and exposure of the plurality of detector elements to X-rays which have passed through a patient, and forming spatial descriptions of internal aspects of the patient from data obtained from the detector assembly; and
an optical modulator formed in the detector assembly, the optical modulator differentially spatially modifying transmission of light from a scintillator cell associated with one detector element to a photodiode in a neighboring detector element and providing different degrees of transmissivity modification between detector elements distributed along a common axis.

10. The computed tomography imaging system of claim 9, wherein the optical modulator includes a grid of intersecting optical inhibitor elements having either a first width or a second width different than the first width.

11. The computed tomography imaging system of claim 9, wherein the optical modulator includes a grid of intersecting optical inhibitor elements formed only in conjunction with diode edges between adjacent photodiodes realized on a common die.

12. The computed tomography imaging system of claim 9, wherein the optical modulator comprises opaque mask elements formed along diode edges between adjacent photodiodes realized on a common die.

13. The computed tomography imaging system of claim 9, wherein the optical modulator comprises one or more of: polyimide, light absorbent silicon, a metallic film, screen-printed opaque material, and a mechanical grid.

14. A process for reducing differential crosstalk in a photodetector array comprising:
optically masking first edges of first photodiodes to a first degree, the first edges forming boundaries between adjacent photodiodes realized on a common die and limiting an active area of each of the first photodiodes to central portions of the first photodiodes; and optically masking second edges of second photodiodes to a second degree that is less than the first degree, with only the second edges occurring at die boundaries.

15. The process of claim 14, further comprising adjusting operating parameters to balance first crosstalk derived from the first photodiodes to match second crosstalk derived from the second photodiodes to reduce a difference between the first and second crosstalk.

16. A process for reducing differential crosstalk in a photodetector array comprising:

optically masking first edges of first photodiodes to a first degree, the first edges forming boundaries between adjacent photodiodes realized on a common die and limiting an active area of each of the first photodiodes to central portions of the first photodiodes; and not masking second edges occurring at die boundaries.

17. The process of claim 14, wherein the photodetector array comprises tessellated die each including a plurality of photodiodes, and an adjacent scintillator array comprising a multiplicity of cells of scintillating material bounded by optically opaque septa, and wherein masking first edges includes intercalating optical mask elements between each one of the plurality of photodiodes and a respective one of the multiplicity of scintillation cells only along edges between photodiodes formed on a common die.

18. A process for reducing differential crosstalk in an array of photodetector elements, the array formed from a plurality of photodiodes each associated with one of a multiplicity of scintillator cells comprising:

inhibiting lateral diffusion of photocarriers within a die across mutual photodiode edges; and optically coupling adjacent photodiodes formed on neighboring die to balance optically-induced crosstalk with laterally diffused photocarrier-induced crosstalk.

19. The process of claim 18, wherein inhibiting and coupling comprise differentially spatially modulating transmission of light from a scintillator cell associated with one photodetector element in the array to a photodiode in a neighboring photodetector detector element in the array.

20. The process of claim 18, wherein optically coupling includes increasing crosstalk between adjacent photodiodes formed on neighboring die.

21. An array of photodetector elements, the array comprising:

multiple tiled die each including a plurality of photodetectors;

a scintillator array including a multiplicity of scintillator cells separated by opaque septa, each of the multiplicity of scintillation cells being associated with a respective one of the plurality of photodetectors; and a crosstalk modification grid associated with the multiple tiled die to differentially modulate crosstalk between photodetector elements formed in central portions of the multiple tiled die relative to crosstalk between adjacent photodetector elements formed on different ones of the multiple tiled die.

22. The array of claim 21, wherein the crosstalk modification grid comprises multiple elements for differentially modulating a photoactive area of each of the plurality of photodetectors.

23. The array of claim 21, wherein the crosstalk modification grid includes one or more of an optical mask and localized concentration of free carrier inhibiting dopant in the die.

* * * * *